C. W. SAUNDERS.
MANDREL.
APPLICATION FILED MAR. 5, 1915.
1,159,998.
Patented Nov. 9, 1915.
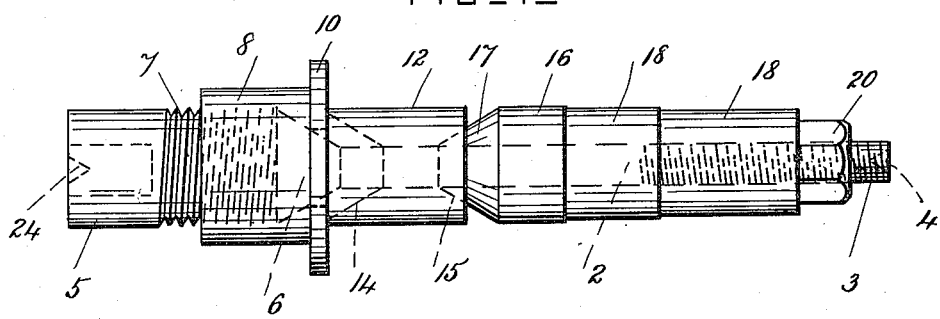
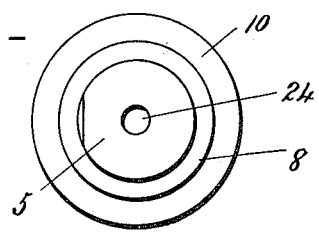
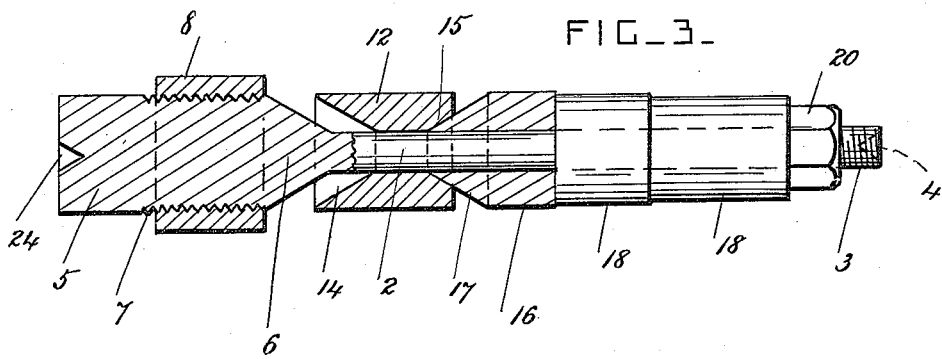
Witnesses
Inventor
Charles W. Saunders
By Herbert W. Jenner.
Attorney

UNITED STATES PATENT OFFICE.

CHARLES W. SAUNDERS, OF NORTH PLATTE, NEBRASKA.

MANDREL.

1,159,998.  Specification of Letters Patent.  Patented Nov. 9, 1915.

Application filed March 5, 1915. Serial No. 12,398.

*To all whom it may concern:*

Be it known that I, CHARLES W. SAUNDERS, a citizen of the United States, residing at North Platte, in the county of Lincoln and State of Nebraska, have invented certain new and useful Improvements in Mandrels; and I do hereby declare the following to be a full, clear, and exact description of the invention, such as will enable others skilled in the art to which it appertains to make and use the same.

This invention relates to mandrels for turning circular articles, such as washers, in lathes; and it consists in the novel construction and combination of the parts hereinafter fully described and claimed.

In the drawings, Figure 1 is a side view of a mandrel constructed according to this invention. Fig. 2 is an end view of the same. Fig. 3 is a side view showing portions of the mandrel in section and with the abutment sleeve screwed back.

The main portion 2 of the mandrel consists of a cylindrical bar 2 having a screwthreaded end portion 3 and a conical hole 4 for a lathe center. A cylinder 5 is provided at the other end portion of the mandrel, and a conical portion 6 connects the cylinder with the bar 2. The cylinder 5 has a screwthreaded portion 7 on its periphery next to the conical part 6. A sleeve 8 is screwed on the part 7 and its periphery is preferably roughened so that the sleeve can be revolved by hand.

A washer 10 is shown to illustrate one way in which the mandrel is used. The hole in the washer is slipped onto the cone 6, and the sleeve 8 is revolved so that it bears as an abutment against the rear side of the washer without unseating it on the cone 6.

A cylinder 12 is provided and is slid upon the bar 2 into contact with the front side of the washer. The rear end of the cylinder 10 has a conical recess 14 adapted to fit the cone 6, and which clears the cone when the front side of the washer is engaged by the cylinder 10. The front end of the cylinder 10 has a conical recess 15, similar to the recess 14, but of less depth. A cylinder 16 is also slid on the bar 2, and has at its rear end a conical portion 17 which fits into the conical recess 15 of the cylinder 10. Distance pieces 18 are also slid upon the bar 2, and a nut 20 is screwed on the screwthreaded portion 7 so as to press the distance pieces and cylinders toward the other end of the mandrel from the nut and thereby clamp the washer securely in place and accurately positioned for turning. The other end of the mandrel from the conical hole 4 has a similar conical hole 24 for the other lathe center. The mandrel is revolved by a driver of approved construction secured on the cylinder 5.

The mandrel can be used for turning other work besides washers, for instance the work to be turned can be mounted on the cylinder 12 when centered between and secured by the cones 6 and 17, using the cylinder 12 as a bushing for the work. The mandrel can also be used in other ways as found convenient, and the great advantage of it is, that while it can be put to ordinary uses, it can also be put to the special use, as shown in Fig. 1, of turning small articles on the outside, which are too short to be held satisfactorily on ordinary mandrels or between centers.

What I claim is:

A mandrel, comprising a bar having at one end portion a cylinder and a cone, and having a screwthreaded part on its other end portion, a cylinder slidable on the bar and having a cone at one end portion, a cylinder for engaging the work slidable on the bar and provided at its opposite ends with conical recesses corresponding in taper with the two said cones and arranged between them, and means, for clamping the last said cylinder with the work on the mandrel, engaging with the screwthreaded end portion of the bar.

In testimony whereof I have affixed my signature in the presence of two witnesses.

CHARLES W. SAUNDERS.

Witnesses:
   I. L. MILTONBERGER,
   MARVIN WEESNER.

Copies of this patent may be obtained for five cents each, by addressing the "Commissioner of Patents, Washington, D. C."